United States Patent
Matsubara et al.

(10) Patent No.: US 9,874,746 B2
(45) Date of Patent: Jan. 23, 2018

(54) HEAD-UP DISPLAY APPARATUS FOR VEHICLE

(71) Applicant: CLARION CO., LTD., Saitama (JP)

(72) Inventors: Takashi Matsubara, Tokyo (JP); Hiroshige Furugori, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 43 days.

(21) Appl. No.: 14/768,604

(22) PCT Filed: Oct. 29, 2013

(86) PCT No.: PCT/JP2013/079233
§ 371 (c)(1),
(2) Date: Aug. 18, 2015

(87) PCT Pub. No.: WO2014/129017
PCT Pub. Date: Aug. 28, 2014

(65) Prior Publication Data
US 2016/0004076 A1    Jan. 7, 2016

(30) Foreign Application Priority Data
Feb. 22, 2013 (JP) .................................. 2013-033132

(51) Int. Cl.
*G02B 27/01* (2006.01)
*G06T 19/00* (2011.01)
(Continued)

(52) U.S. Cl.
CPC .......... *G02B 27/0101* (2013.01); *B60K 35/00* (2013.01); *G01C 21/365* (2013.01);
(Continued)

(58) Field of Classification Search
CPC .......... G09G 2380/10; G09G 2380/12; G02B 27/01–27/0103; G02B 27/0179; G02B 2027/0181–2027/0187
See application file for complete search history.

(56) References Cited

U.S. PATENT DOCUMENTS

2002/0167589 A1* 11/2002 Schofield ............. G08G 1/0175
348/135
2005/0154505 A1* 7/2005 Nakamura ........... G01C 21/365
701/1
(Continued)

FOREIGN PATENT DOCUMENTS

JP       06-87043 U    12/1994
JP     H08-192664 A     7/1996
(Continued)

OTHER PUBLICATIONS

Notice of Reasons for Refusal mailed by Japan Patent Office dated Sep. 13, 2016 in corresponding Japanese patent application No. 2015-501267.
(Continued)

*Primary Examiner* — David Tung
(74) *Attorney, Agent, or Firm* — IP Business Solutions, LLC

(57) ABSTRACT

Proper display is performed in consideration of a characteristic that a vehicle head-up display device 1 is mounted in a vehicle. The vehicle head-up display device 1 for displaying a virtual image displays plural virtual images which are different in focal distance.

4 Claims, 11 Drawing Sheets

(51) Int. Cl.
*G01C 21/36* (2006.01)
*B60K 35/00* (2006.01)

(52) U.S. Cl.
CPC .... *G06T 19/006* (2013.01); *B60K 2350/1096* (2013.01); *G02B 2027/0127* (2013.01); *G02B 2027/0141* (2013.01); *G02B 2027/0185* (2013.01); *G09G 2360/144* (2013.01); *G09G 2380/10* (2013.01); *G09G 2380/12* (2013.01)

(56) References Cited

U.S. PATENT DOCUMENTS

| | | | |
|---|---|---|---|
| 2006/0071877 A1 | 4/2006 | Kanamori et al. | |
| 2007/0124041 A1* | 5/2007 | Kwon | H04N 21/4122 701/408 |
| 2007/0194902 A1* | 8/2007 | Blanco | G01C 21/365 340/461 |
| 2009/0067057 A1 | 3/2009 | Sprague et al. | |
| 2013/0076787 A1* | 3/2013 | Mathieu | B60R 1/00 345/633 |
| 2013/0242404 A1 | 9/2013 | Kobayashi | |
| 2013/0300554 A1* | 11/2013 | Braden | G08G 1/096775 340/441 |
| 2014/0036374 A1* | 2/2014 | Lescure | G02B 27/0101 359/630 |

FOREIGN PATENT DOCUMENTS

| | | |
|---|---|---|
| JP | 2004-168230 A | 6/2004 |
| JP | 2005-119470 A | 5/2005 |
| JP | 2006-001377 A | 2/2006 |
| JP | 2006-106254 A | 4/2006 |
| JP | 2010-137698 A | 6/2010 |
| JP | 2012-179935 A | 9/2012 |
| WO | 2009/035783 A2 | 3/2009 |

OTHER PUBLICATIONS

Extended European Search Report dated Sep. 21, 2016 in corresponding European patent application No. 13875738.0.
International Preliminary Report on Patentability issued for corresponding PCT/JP2013/079233 application.
International Search Report dated Jan. 21, 2014 issued in corresponding PCT/JP2013/079233.
Notice of Reasons for Refusal mailed by Japan Patent Office dated May 17, 2016 in the corresponding Japanese patent application No. 2015-501267.
Notice of Reasons for Refusal mailed by Chinese Patent Office dated Dec. 2, 2016 in the corresponding Chinese patent application No. 201380073633.9.
Notice of Reasons for Refusal mailed by Chinese Patent Office dated Jun. 1, 2017 in corresponding Chinese patent application No. 2013800736339.

* cited by examiner

FIG.4
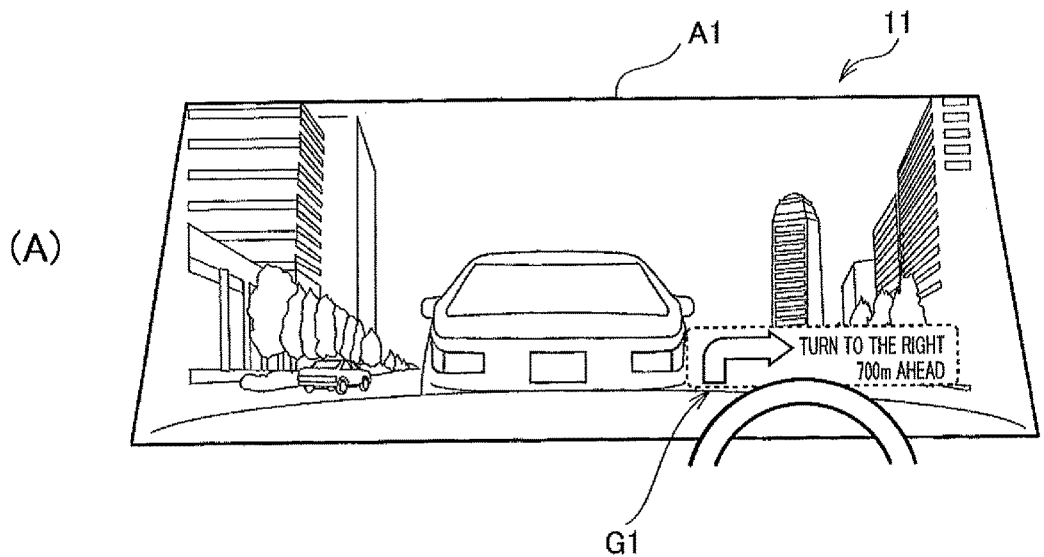
(A)
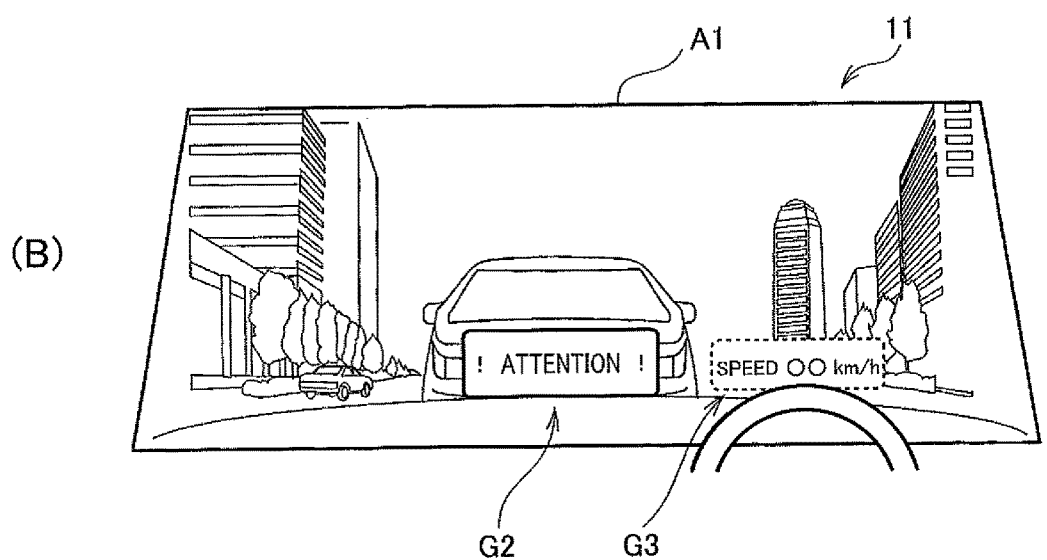
(B)

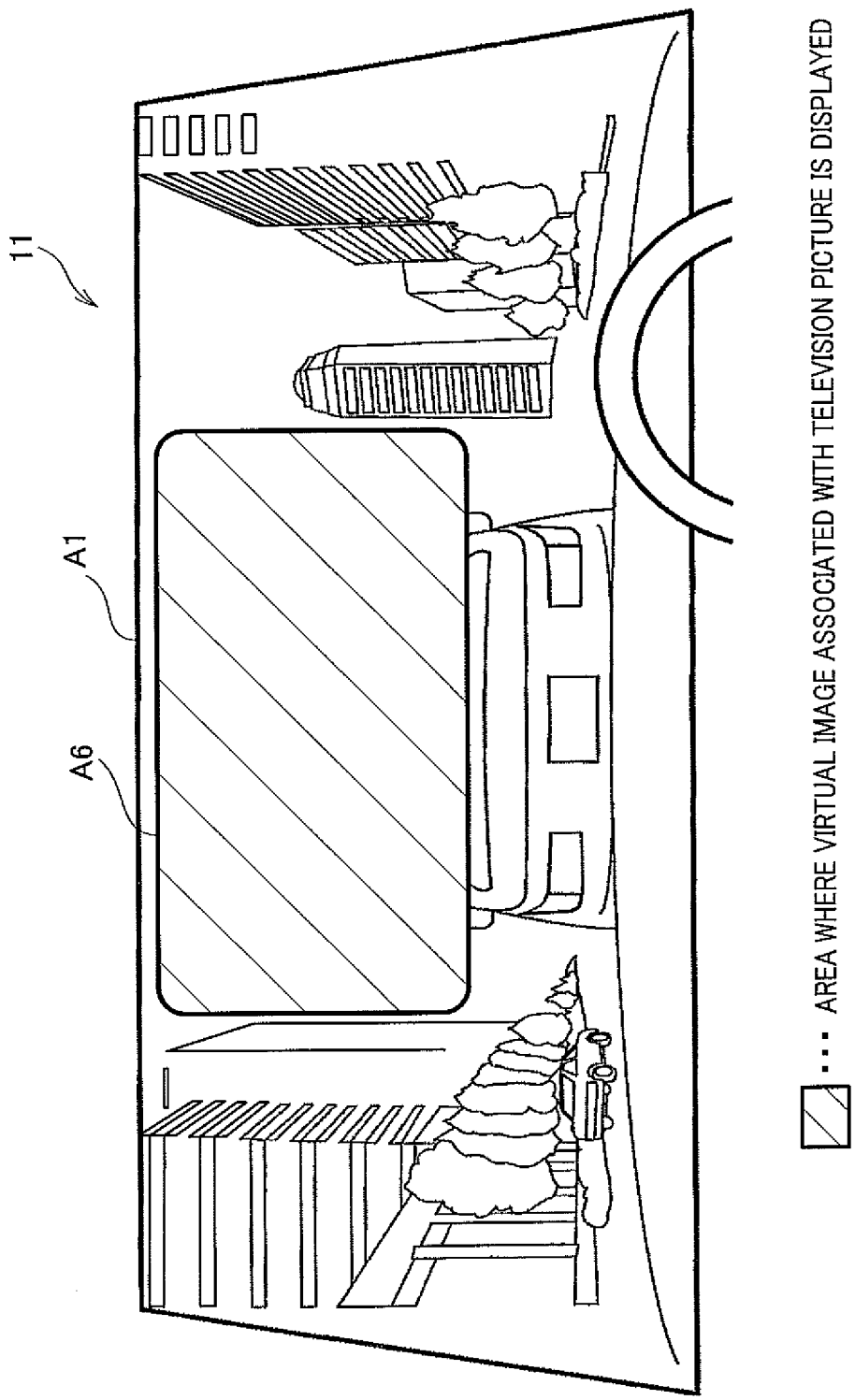

HEAD-UP DISPLAY APPARATUS FOR VEHICLE

TECHNICAL FIELD

The present invention relates to a head-up display apparatus for a vehicle which is mounted in a vehicle.

BACKGROUND ART

A head-up display apparatus which is mounted in a vehicle has been conventionally known (see Patent Document 1, for example).

PRIOR ART DOCUMENT

Patent Document

Patent Document 1: JP-A-H8-192664

SUMMARY OF THE INVENTION

Problem to be Solved by the Invention

With respect to apparatuses mounted in vehicles such as the above-described head-up display apparatus, there is a need that proper display is performed based on the characteristic that that they are mounted in vehicles.

The present invention has been implemented in view of the foregoing situation, and has an object to perform proper display based on the characteristic that an apparatus is mounted in a vehicle.

Means of Solving the Problem

In order to attain the above object, a head-up display apparatus for a vehicle that displays a virtual image is characterized in that a plurality of virtual images having different focal distances are displayed, for example.

Effect of the Invention

According to the present invention, the head-up display apparatus can perform proper display based on the characteristic that the apparatus is mounted in a vehicle.

BRIEF DESCRIPTION OF THE DRAWINGS

FIG. 4 is a diagram showing a display example of a virtual image when the vehicle travels.

FIG. 11 is a diagram showing a display example of a virtual image when the vehicle stops.

MODES FOR CARRYING OUT THE INVENTION

Embodiments according to the present invention will be described hereunder with reference to the drawings.

First Embodiment

Figure 1:
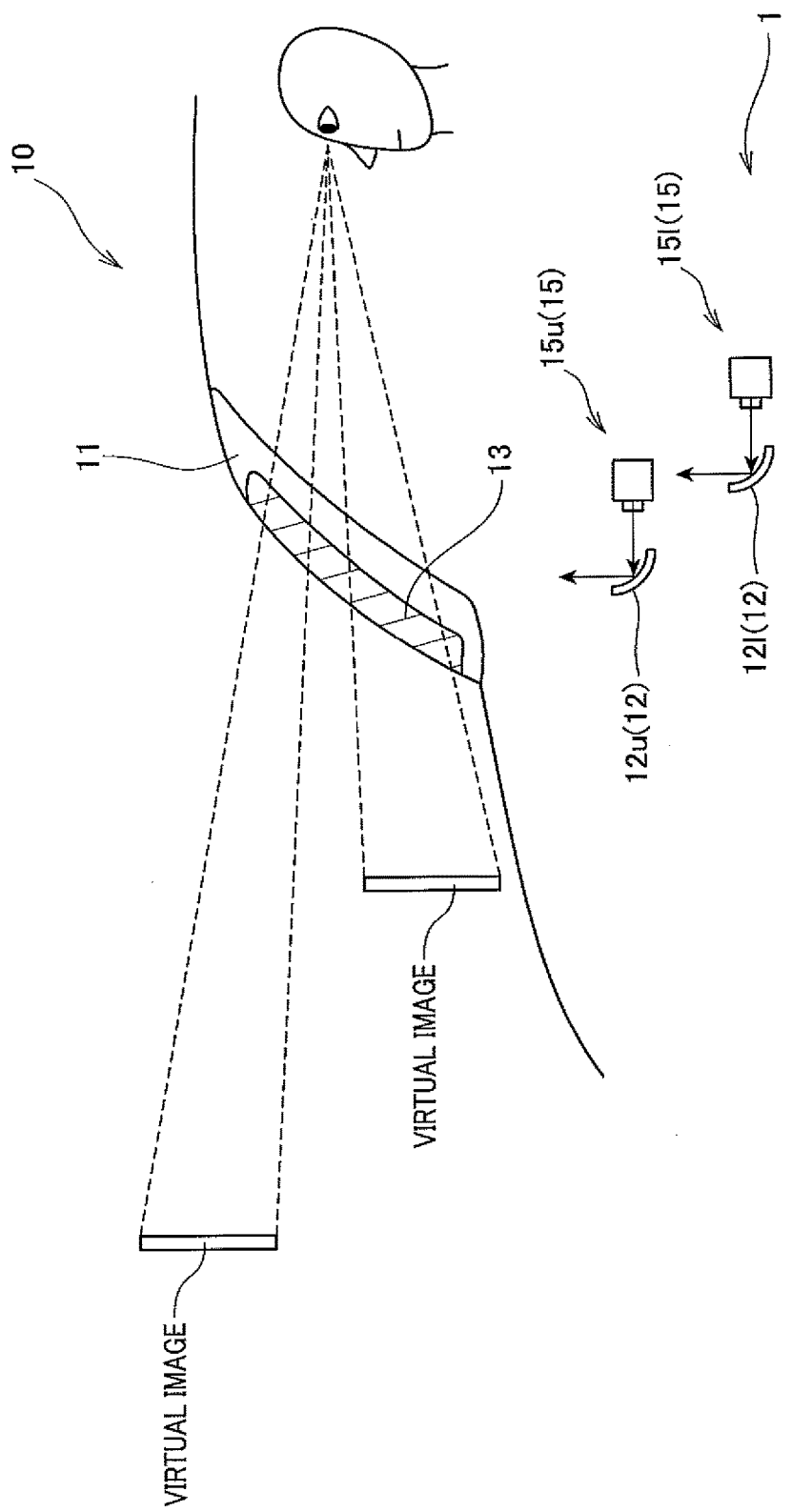
FIG. 1 is a diagram showing a display mode of a virtual image based on a head-up display apparatus for a vehicle according to a first embodiment.
Figure 2:
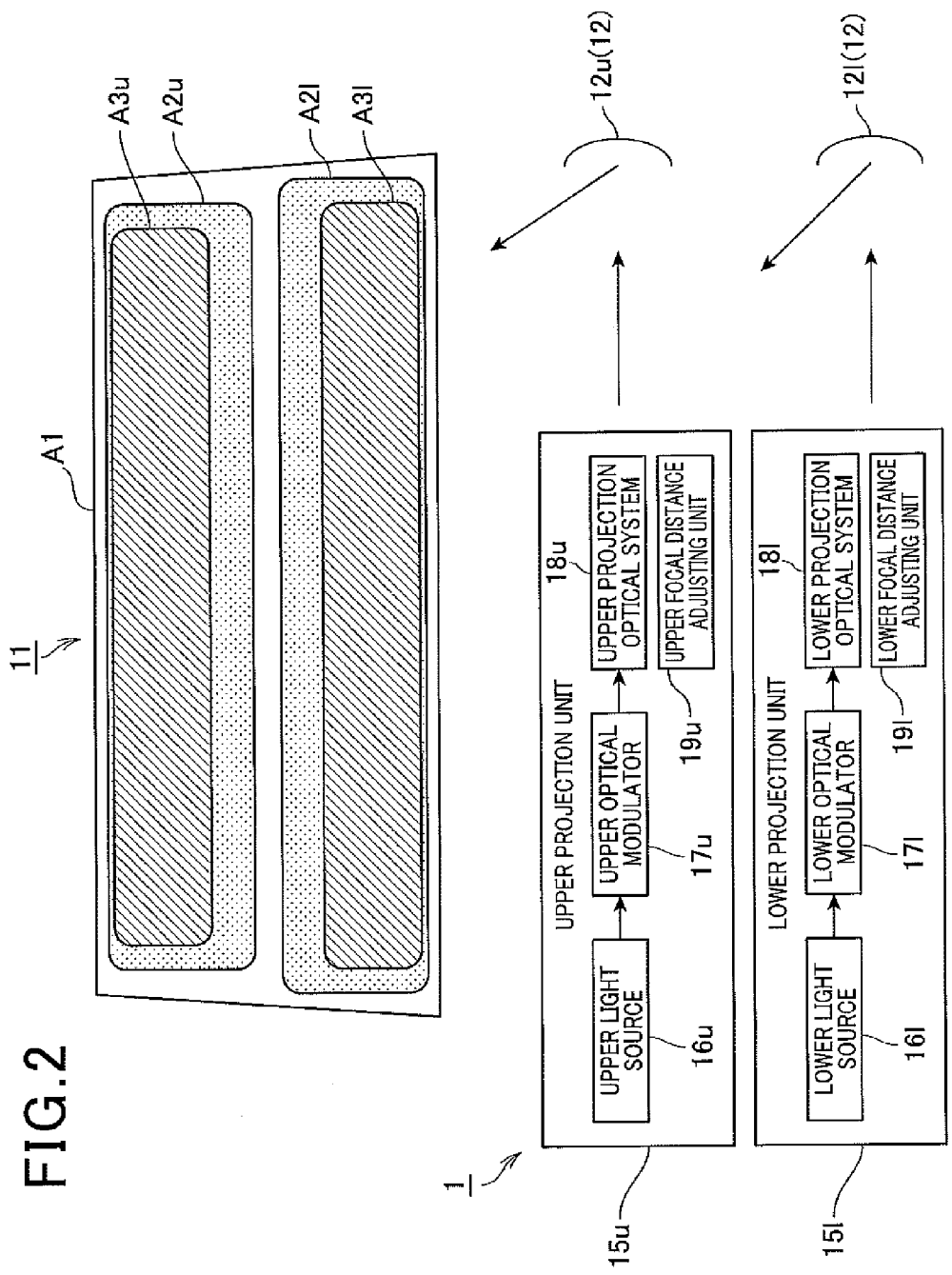
FIG. 2 is a diagram showing an area where a virtual image is displayed.

FIG. 1 is a diagram which schematically shows a mode suitable for description with respect to a display mode of a visual image based on a head-up display device 1 for a vehicle according to an embodiment. FIG. 2 is a diagram which schematically shows a mode suitable for description with respect to construction of the vehicle head-up display device 1 and an area where a visual image is displayed by the device.

As shown in FIG. 1, the vehicle head-up display device 1 is equipped at a predetermined position below a front windshield 11 in a vehicle 10, and it projects light (image light) for displaying a visual image to a projection face 13 formed on the front windshield 11 through a reflection mirror 12, whereby the virtual image is displayed (projected) in front of an occupant of the vehicle 10. The projection face 13 may be configured so that a seal having a half mirror function is attached to the projection face 13 or the projection face 13 is subjected to proper processing or the like so that the vehicle occupant can visually recognize the virtual image more clearly.

As shown in FIGS. 1, 2, the vehicle head-up display device 1 has an upper projection unit 15$u$ and a lower projection unit 15$l$.

The upper projection unit 15$u$ contains an upper light source 16$u$ having a light source such as a lamp or the like, an upper optical modulator 17$u$ for modulating light emitted from the upper light source 16$u$ in accordance with an image to be displayed as a visual image and outputting the modulated light, and an upper projection optical system 18$u$ for subjecting the modulated light output from the upper optical modulator 17$u$ to various kinds of adjustment such as focus adjustment, enlargement/reduction, etc. to project light (image light) for displaying the visual light. Furthermore, the upper projection unit 15$u$ has an upper focal distance adjusting unit 19$u$ for performing adjustment of the interval distance between the upper projection optical system 18$u$ and the upper reflection mirror 12$u$ and other adjustments of the projection optical system, thereby adjusting the focal distance of the virtual image to be displayed with the light projected from the upper projection unit 15$u$.

Here, as shown in FIG. 2, a front windshield corresponding area A1 is formed in the area corresponding to the front windshield 11. An upper virtual image displayable area A2$u$ is formed in an area which is located at an upper portion of the front windshield corresponding area A1 and provided so as to extend over a substantially upper half portion of the front windshield corresponding area A1. The upper virtual image displayable area A2$u$ is a largest area where a virtual image can be displayed by the upper projection unit 15$u$. That is, various kinds of mechanisms related to the upper projection unit 15$u$ are adjusted so that a virtual image to be displayed on the basis of an image projected by the upper projection unit 15u is displayed within the upper virtual image displayable area A2u, and the upper projection unit 15u can display a virtual image at any position within the upper virtual image displayable area A2u.

Here, the displaying of a virtual image within the upper virtual image displayable area A2u means that the virtual image is formed so that the vehicle occupant of the vehicle 10 can visually recognize the virtual image within the area concerned, but it does not mean that an image is projected within the area concerned. In the following description, when "a virtual image is displayed in a specific area" is expressed, it means that the virtual image is formed so that the vehicle occupant of the vehicle 10 can visually recognize the virtual image within the specific area.

As shown in FIG. 2, an upper virtual image display area A3u is formed in an area corresponding to an upper portion of the upper virtual image displayable area A2u, that is, an area corresponding to an upper area of the front windshield 11. The upper virtual image display area A3u is an area in which the upper projection unit 15u actually displays a virtual image. That is, the upper projection unit 15u can display a virtual image at any position of the upper virtual image displayable area A2u, but actually displays a virtual image within the upper virtual image display area A3u by software-based means.

As shown in FIG. 2, the lower projection unit 15l has a lower light source 16l, a lower optical modulator 17, a lower projection optical system 18l and a lower focal distance adjusting unit 19l as in the case of the upper projection unit 15u. A lower virtual image displayable area A2l as a largest area where a virtual image can be displayed by the lower projection unit 15l is formed in an area which is located at a lower portion of the front windshield corresponding area A1 and provided so as to extend over a substantially lower half portion of the front windshield corresponding area A1, and a lower virtual image display area A3l is formed at the lower portion of the lower virtual image displayable area A2l. The lower virtual image display area A3l is an area where the lower projection unit 15l actually displays a virtual area, and is formed in an area corresponding to the lower area of the front windshield 11.

Figure 3:
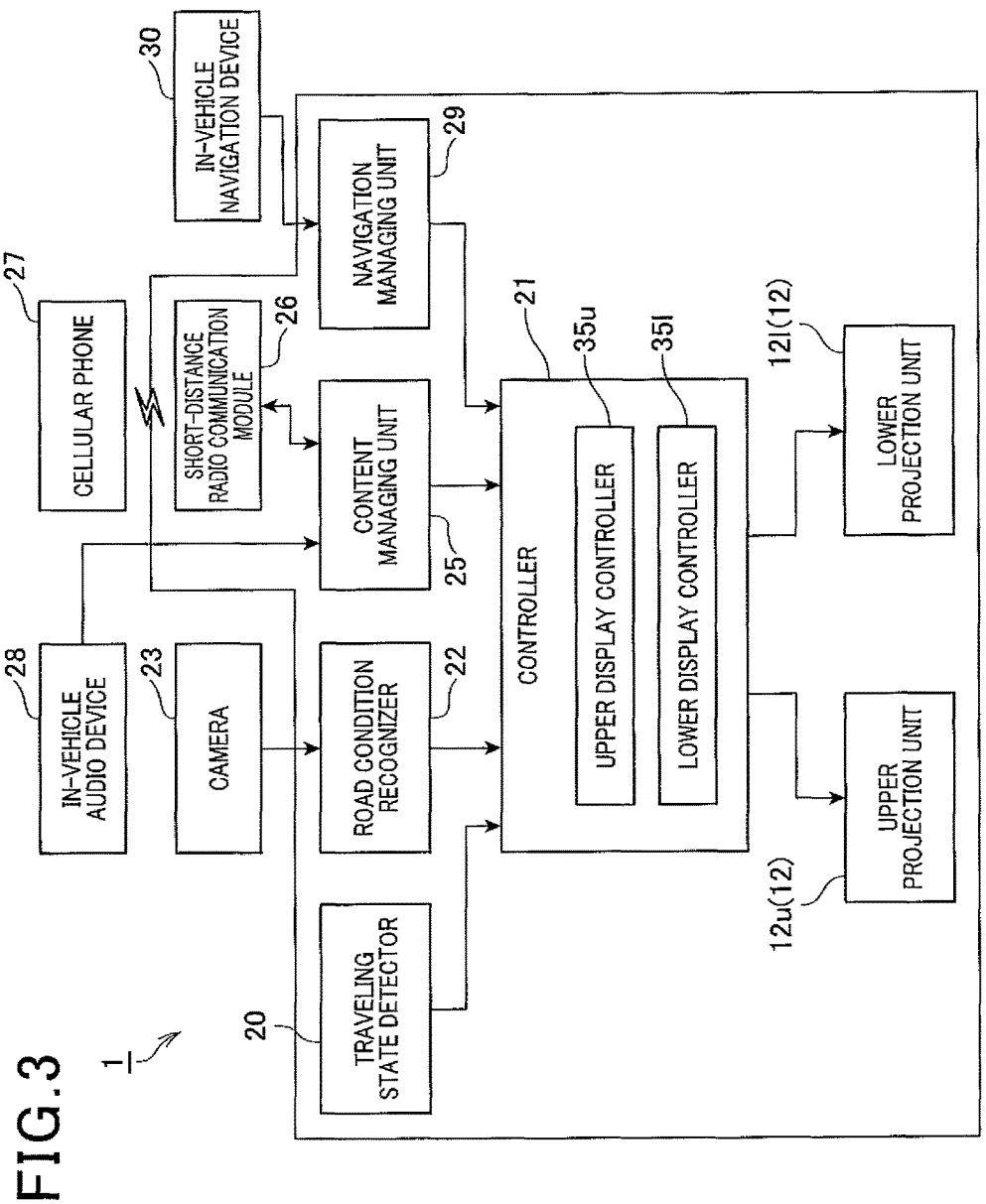
FIG. 3 is a diagram showing a functional construction of the head-up display apparatus for the vehicle.

FIG. 3 is a block diagram showing the functional construction of the vehicle head-up display device 1.

A traveling state detector 20 (traveling state detecting means) detects the traveling state of the vehicle 10 and outputs it to a controller 21. Particularly, in this embodiment, the traveling state detector 20 is connected to a sensor for detecting the state of a parking brake, detects on the basis of a detection value of the sensor whether the vehicle 10 is set to be stopped while the parking brake is actuated, and outputs a detection result to the controller 21. Furthermore, the traveling state detector 20 calculates the speed of the vehicle 10 on the basis of a vehicle speed pulse of the vehicle 10, and outputs it to the controller 21. Any method may be used as a method of determining the speed of the vehicle 10.

A road condition recognizer 22 recognizes the road condition around the vehicle 10, and outputs a recognition result to the controller 21. Particularly, in this embodiment, the road state recognizer 22 is provided at a predetermined position of the front portion of the vehicle 10, and connected to a camera 23 for imaging a front side of the vehicle 10. On the basis of an imaging result of the camera 23, the road condition recognizer 22 determines whether any other vehicle exists in front of the vehicle 10, and outputs the determination result to the controller 21.

A content management unit 25 is a function block for managing contents, and has at least the following function.

That is, the content managing unit 25 is connected to a short-distance radio communication module 26 for performing radio communication in conformity with the standards for short-distance radio communication such as Bluetooth (registered trademark), and configured to be communicable with a cellular phone 27 owned by an occupant of the vehicle 10 or the like through the module. A terminal which communicates with the content managing unit 25 is not limited to the cellular phone 27, but may be a notebook PC, a tablet terminal or the like.

An application having at least the following two functions is preinstalled in the cellular phone 27.

A first function is the following function: when a reception-detectable mail such as a mail based on SMS, a Web mail or the like is received, the reception concerned is notified to the content managing unit 25 through the short-distance radio communication module 26. The content managing unit 25 can arbitrarily inquire about reception or non-reception of a mail to the cellular phone 27 under the control of the controller 21, and acquire reception or non-reception of a mail.

A second function is the following function: when news such as news conformed with the standards for RSS or the like is distributed, information representing the news is output to the content managing unit 25 as data of a predetermined format. The content management unit 25 can arbitrarily inquire about distribution or non-distribution of new news to the cellular phone 27 under the control of the controller 21, and acquire information representing the new news when the new news has been distributed.

Furthermore, the content managing unit 25 is connected to an in-vehicle audio device 28. The content managing unit 25 communicates with the in-vehicle audio device 28 in conformity with a predetermined protocol to acquire information on a content reproduced by the in-vehicle audio device 28 and output the information to the controller 21. When the in-vehicle audio device 28 reproduces music recorded in CD, a hard disc or the like, the information on the content is information on the music being reproduced, for example, the title of the music, an artist's name, a reproduction time, etc. When the in-vehicle audio device 28 reproduces a radiobroadcast program, the information is information on the program being reproduced.

A navigation managing unit 29 is connected to an in-vehicle navigation device 30 mounted in the vehicle 10, and arbitrarily obtains information on navigation from the device concerned. Then, the navigation managing unit 29 outputs information on proper navigation to the controller 21 at a proper timing while the in-vehicle navigation device 30 performs navigation.

For example, when the navigation managing unit 29 detects that the vehicle 10 approaches to a position at a predetermined distance (for example, 700 m) from an intersection at which the vehicle should turn to the right/left, the navigation managing unit 29 outputs information representing this fact to the controller 21. Furthermore, for example when the navigation managing unit 29 detects that the vehicle 10 approaches to a position at a predetermined distance from a destination, the navigation managing unit 29 outputs information representing this fact to the controller 21. Furthermore, the timing (trigger) at which the navigation managing unit 29 outputs the information on the navigation and also the information to be output are determined in advance.

The controller 21 has CPU, control programs executed by CPU, ROM for storing data associated with the control programs, RAM functioning as a working area, and other peripheral circuits and peripheral equipment, and concentrically controls the respective parts of the vehicle head-up display device 1.

As shown in FIG. 3, the controller 21 has an upper display controller 35u, and a lower display controller 35l. The functions of the respective function blocks equipped to the controller 21 are executed by the cooperation between hardware and software, for example by CPU's reading of the programs or the like. The functions of the respective function blocks will be described later.

Next, a mode of a virtual image displayed by the vehicle head-up display device 1 will be described in detail.

As described above, the upper projection unit 15u displays a virtual image in the upper virtual image display area A3u, and the lower projection unit 15l displays a virtual image in the lower virtual image display area A3l.

According to this embodiment, when a virtual image is displayed, the focal distance of a virtual image displayed in the upper virtual image display area A3u is set to be longer than the focal distance of a virtual image displayed in the lower virtual image display area A3l. The reason for this is as follows.

That is, the upper virtual image display area A3u is an area formed at the upper portion of the front windshield 11, and a target which the occupant of the vehicle 10 visually recognizes through the upper portion of the front windshield 11 is normally a building, a mountain, the sky or the like which is far away from the eyes of the vehicle occupant. Therefore, the probability that the focal point of the vehicle occupant's eyes when the occupant visually recognizes the outside of the vehicle through the upper portion of the front windshield 11 is matched with the focal point when the occupant visually recognizes a target located in the distance is high. According to this embodiment, in consideration of this, by adjusting the focal distance of the virtual image with the upper focal distance adjusting unit 19u, the focal distance of the virtual image displayed in the upper virtual image display area A3u is set to be longer than the focal distance of the virtual image displayed in the lower virtual image display area A3l. For example, the focal distance of the virtual image displayed in the upper virtual image display area A3u is set to the focal distance corresponding to a building, a mountain or the like located in the distance or the focal distance of the sky, for example. Accordingly, when the occupant of the vehicle 10 visually recognizes the virtual image displayed in the upper virtual image display area A3u, the load for focusing the eyes is reduced, and thus the comfort is enhanced.

The lower virtual image display area A3l is an area formed at the lower portion of the front windshield 11. A target which the occupant of the vehicle 10 visually recognizes through the lower portion of the front windshield 11 is the hood (bonnet) of the vehicle 10 in the neighborhood of the occupant's eyes or a rear portion of another vehicle traveling at the front side of the vehicle 10. Therefore, the probability that the focal point of the occupant when the occupant visually recognizes the outside of the vehicle through the lower portion of the front windshield 11 is matched with the focal point when the occupant visually recognizes a target located in the neighborhood of the occupant is high. According to this embodiment, in consideration of this, by adjusting the focal distance of the virtual image with the lower focal distance adjusting unit 19l, the focal distance of the virtual image displayed in the lower virtual image display area A3l is set to be shorter than the focal distance of the virtual image displayed in the upper virtual image display area A3u. For example, the focal distance of the virtual image displayed in the lower virtual image display area A3l is set to the focal distance corresponding to the hood (bonnet). Accordingly, a load of focusing the eyes when the occupant of the vehicle 10 visually recognizes the virtual image displayed in the lower virtual image display area A3l is reduced, and the comfort is enhanced.

That is, according to this embodiment, in consideration of the characteristic that the probability that with respect to targets visually-recognized through the front windshield 11, a target located at an upper side exists at a nearer position than a target located at a lower side is high, the focal distance of a virtual image displayed at the upper side is set to be longer than the focal distance of a virtual image displayed at the lower side, thereby reducing the load when the occupant focuses his/her eyes on the virtual images.

Next, a display mode of a virtual image "under traveling" of the vehicle 10 will be described by citing a specific example.

In this example, during traveling of the vehicle 10, only the lower virtual image display area A3l is set to a virtual image displayable area. In other words, display of a virtual image in the upper virtual image display area A3u is prohibited. Accordingly, display of a virtual image at a proper position in consideration of the traveling of the vehicle is performed.

FIG. 4(A) is a diagram showing an example of a virtual image displayed under traveling.

In the example of FIG. 4(A), a virtual image G1 associated with information representing that the vehicle should turn to the right at an intersection located ahead of the vehicle by 700 m is displayed in the lower virtual image display area A3l.

The operation of the vehicle head-up display device 1 when the virtual image G1 associated with the example of FIG. 4(A) is displayed will be described hereunder.

In the example of FIG. 4(A), it is set as one of triggers for displaying the virtual image associated with the information on the navigation that the interval distance between the intersection at which the vehicle should turn to the right/left and the vehicle 10 is equal to 700 m. During traveling, the lower display controller 35l monitors, on the basis of an input from the navigation managing unit 29, whether the interval distance between an intersection at which the vehicle should turn to the right/left and the vehicle 10 is equal to 700 m. When the interval distance is equal to 700 m (in this example, it is assumed that the vehicle turns to the right at an intersection which is located ahead of the vehicle by 700 m), the lower virtual image display area A3l generates image date associated with the information representing this fact, that is, image data associated with the virtual image G1. Subsequently, the lower display controller 35l modulates light emitted from the lower light source 16l on the basis of the generated image data through the lower optical modulator 17l of the lower projection unit 15l, and then projects the image (light for the virtual image G1) from the lower projection optical system 18l, whereby the virtual image G1 is displayed in the lower virtual image display area A3l. As described above, the virtual image G21 is displayed at a proper timing and at a proper position as shown in FIG. 4(A).

FIG. 4(B) is a diagram showing another example of the virtual image displayed during traveling.

In the example of FIG. 4(B), a virtual image G2 associated with information representing that attention should be paid to another forehand vehicle and a virtual image G3 associated with information representing the speed of the vehicle 10 are displayed in the lower virtual image display area A3*l*.

The operation of the vehicle head-up display device 1 when the virtual images G2, G3 associated with the example of FIG. 4(B) will be described hereunder.

In the example of FIG. 4(B), when another vehicle exists in front of the vehicle 10, it is set as one of triggers for displaying the virtual image G2 that the vehicle 10 travels at a speed which is equal to or higher than a predetermined speed. During traveling, the lower display controller 35*l* monitors on the basis of inputs from the traveling state detector 20 and the road condition recognizer 22 whether another vehicle exists in front and the vehicle 10 is set to travel at a speed which is equal to or higher than the predetermined speed. When the vehicle 10 falls into the above state, the lower display controller 35*l* generates image data associated with the virtual image G2, and controls the lower projection unit 15*l* on the basis of the image data, whereby the virtual image G2 is displayed in the lower virtual image display area A3*l*.

Furthermore, in the example of FIG. 4(B), during traveling, the virtual image G3 associated with the information representing the speed of the vehicle 10 is displayed at a predetermined position within the lower virtual image display area A3*l*. Furthermore, during traveling, the lower display controller 35*l* detects the speed of the vehicle 10 on the basis of an input from the traveling state detector 20 at a predetermined sampling period, generates image data associated with the virtual image G3 based on the detected speed of the vehicle 10, and controls the lower projection unit 15*l* on the basis of the generated image data to display the virtual image G3 in the lower virtual image display area A3*l*.

The information displayed in the lower virtual image display area A3*l* is not limited to that exemplified in FIG. 4(B). For example, the device may be configured so that a pedestrian is detectable on the basis of an output of a camera 23, another imaging device or a sensor, and when a pedestrian is detected, this fact may be displayed to invite attention. Furthermore, the device may be configured so that it is detectable on the basis of an output of a camera 23, another imaging device or a sensor whether the vehicle 10 deviates from the traffic lane, and when it is detected that the vehicle deviates from the traffic lane, this fact may be displayed to give warning. All the existing techniques may be used for the detection of a pedestrian and detection of deviation from traffic lanes.

That is, a virtual image associated with information on the driving is broadly displayable in the lower virtual image display area A3*l*.

Next, the operation of the vehicle head-up display device 1 when the vehicle 10 under traveling makes a stop will be described.

Figure 5:
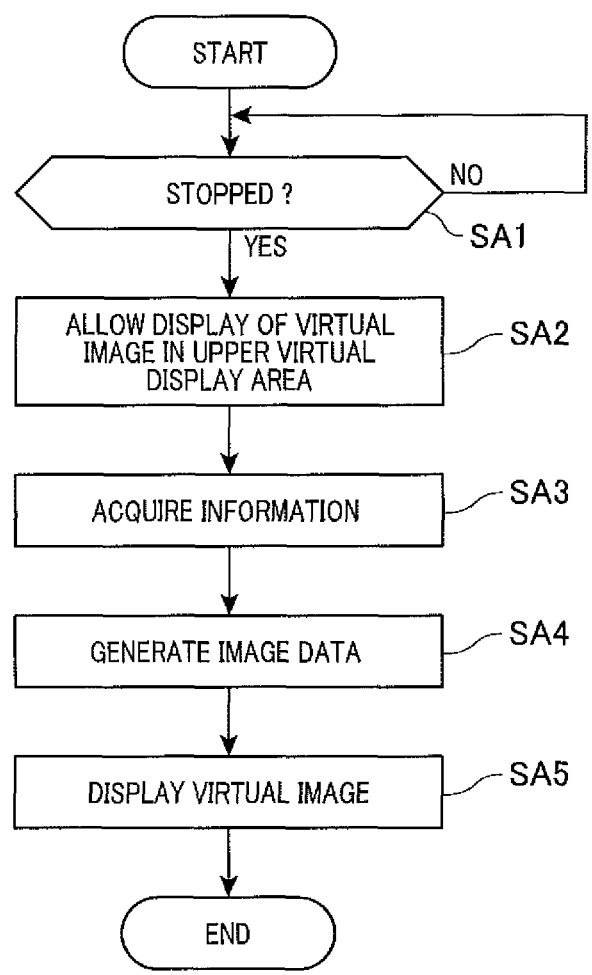
FIG. 5 is a flowchart showing the operation of the head-up display apparatus for the vehicle.

FIG. 5 is a flowchart showing the operation of the vehicle head-up display device 1 when the vehicle 10 under traveling stops. It is assumed that the vehicle 10 is traveling at the start time point of the flowchart of FIG. 5.

Figure 6:
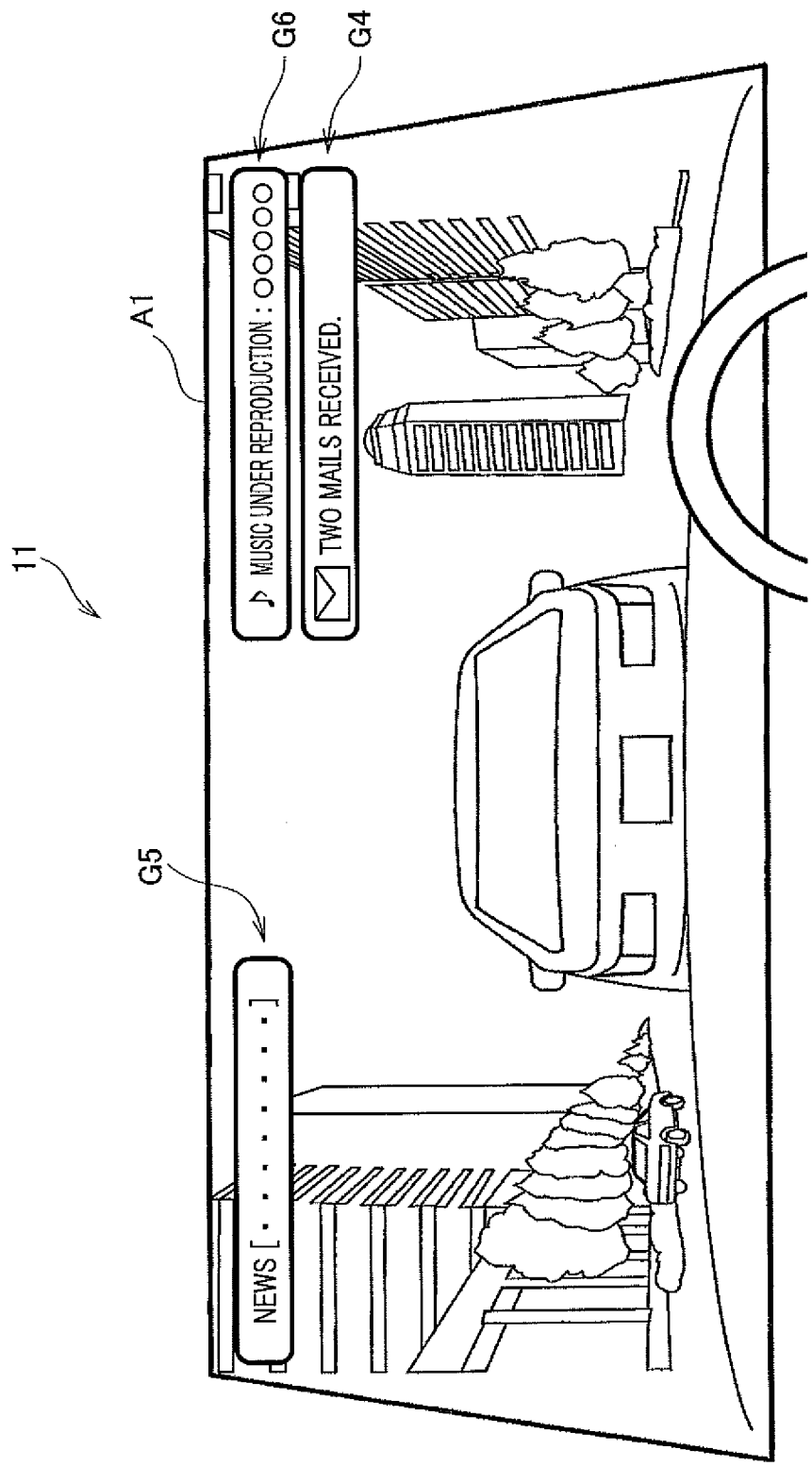
FIG. 6 is a diagram showing a display example of a virtual image when the vehicle stops.

FIG. 6 is a diagram showing an example of a virtual image displayed when the vehicle stops.

Referring to FIG. 5, the controller 21 monitors on the basis of an input from the traveling state detector 20 whether the vehicle 10 stops while applying a parking brake (step SA1). When the vehicle 10 stops (step SA1: YES), the controller 21 allows display of a virtual image to the upper virtual image display area A3*u* which is prohibited from displaying a virtual image under traveling, whereby the upper virtual image display area A3*u* is shifted to a virtual image displayable state (step SA2).

Subsequently, the upper display controller 35*u* of the controller 21 acquires information to be displayed as a virtual image in the upper virtual image display area A3*u* (step SA3).

The processing of the step SA3 will be described in detail by referring to FIG. 6 as an example. In the example of FIG. 6, when the cellular phone 27 receives a new mail, a virtual image G4 associated with information representing this fact is displayed in the upper virtual image display area A3*u* in response to the stop of the vehicle 10. When new news is distributed to the cellular phone 27, a virtual image G5 associated with information representing the news is displayed in the upper virtual image display area A3*u* in response to the stop of the vehicle 10. When a content is reproduced by the in-vehicle audio device 28, a virtual image G6 associated with information on the content is displayed in the upper virtual image display area A3*u* in response to the stop of the vehicle 10.

The respective virtual images G4, G5 and G6 are virtual images which are simultaneously displayed with common light, and thus they should be originally captured as one virtual image. However, for convenience of explanation, these virtual images are represented by difference reference numerals, and described while discriminated from one another.

In step SA3, the upper display controller 35*u* controls the content managing unit 25 to inquire about reception or non-reception of a mail (s) to the cellular phone 27. When a mail is received, the upper display controller 35*u* acquires information representing reception of the mail as information to be displayed as a virtual image (virtual image G4).

Furthermore, in step SA3, the upper display controller 35*u* controls the content managing unit 25 to inquire about distribution or non-distribution of new news to the cellular phone 27. When the distribution of the new news is performed, the upper display controller 35*u* acquires information representing the new news as information to be displayed as a virtual image (virtual image G5).

Furthermore, in step SA3, the upper display controller 35*u* controls the content managing unit to inquire whether any content is reproduced by the in-vehicle audio device 28. When some content is reproduced, the upper display controller 35*u* acquires information on the content as information to be displayed as a virtual image (virtual image G6).

Subsequently, the upper display controller 35*u* generates image data containing various information acquired in step SA3 (step SA4). With respect to each information, the position at which the information is displayed as a virtual image in the upper virtual image display area A3*u* is predetermined, and proper image data is generated in conformity with the position at which each information should be displayed in step SA4.

Subsequently, the upper display controller 35*u* modulates light emitted from the upper light source 16*u* on the basis of the image data generated in step SA4 through the upper optical modulator 17*u* of the upper projection unit 15*u*, and then projects an image (light) from the upper projection optical system 18*u*, thereby displaying the virtual images G4, G5 and G6 in the lower virtual image display area A3*l* (step SA5).

When the parking brake is released after stopping, the upper display controller 35*u* stops the display of the virtual image in the upper virtual display area A3*u*, and then prohibits the display of the virtual image in the area concerned. Accordingly, the virtual image is displayed in the upper virtual display area A3u only during stopping.

As described above, in this embodiment, virtual images associated with information on the speed of the vehicle 10 and information relating to the driving such as information on navigation, information on the traveling condition of the vehicle 10, etc. are displayed in the lower virtual image display area A3l. Furthermore, virtual images associated with information on mails, entertainment-based information (information containing information other than the information on the driving) such as information on news, information on reproduction of the in-vehicle audio device 28, etc. are displayed in the upper virtual image display area A3u. The reason for this is as follows. That is, with respect to a virtual image displayed in the upper virtual image display area A3u, during stopping of the vehicle, the vehicle occupant can visually recognize the virtual image without dropping his/her eyes and with relax while leaning against the seat backrest of the vehicle 10 and resting the back of the head of the vehicle occupant on a head rest. Therefore, during stopping, the vehicle occupant can more conformably visually recognize the virtual image displayed in the upper virtual image display area A3u as compared with a virtual image displayed in the lower virtual image display area A3l. In consideration of this, the vehicle head-up display device 1 according to this embodiment displays the virtual image associated with each information described above in the upper virtual image display area A3u.

On the other hand, it is improper to display a virtual image in the upper virtual display area A3u during the driving. In consideration of this, the vehicle head-up display device 1 according to this embodiment executes display of a virtual image in the upper virtual image display area A3u during only stopping.

As described above, the vehicle head-up display device 1 according to this embodiment displays plural virtual images different in focal distance.

According to this construction, as described above, it is possible that the focal distance of the virtual image displayed at the upper side is set to be longer than the focal distance of the virtual image displayed at the lower side in the front windshield corresponding area A1, thereby enhancing the comfort of the vehicle occupant. That is, proper display can be performed in consideration of the characteristic that the vehicle head-up display device 1 is mounted in a vehicle.

The vehicle head-up display device 1 according to this embodiment projects light to the projection face 13 formed on the front windshield 11, and displays a virtual image in the front windshield corresponding area A1 as the area corresponding to the front windshield 11. In this embodiment, plural virtual display areas which are different in focal distance of a virtual image to be displayed, that is, the upper virtual image display area A3u and the lower virtual image display area A3l are formed in the front windshield corresponding area A1.

According to this construction, a virtual image having a proper focal distance can be displayed every thus-formed virtual display area.

In this embodiment, the projection face 13 is formed on the front windshield 11. However, the projection face is not necessarily formed on the front windshield 11, and it may be formed on a member which is provided so as to correspond to the front windshield 11. For example, a dedicated half mirror may be provided as the projection face 13 at a proper position in the neighborhood of the front windshield 11, so that virtual images are formed in the upper virtual display area A3u and the lower virtual image display area A3l by projecting light to the half mirror.

Furthermore, in this embodiment, with respect to the plural virtual image display areas (the upper virtual image display area A3u and the lower virtual image display area A3l) formed in the front windshield corresponding area A1, the focal distance of the virtual image displayed in the virtual image display area (the upper virtual image display area A3u) located at the upper side is set to be longer than the focal distance of the virtual image displayed in the virtual image display area (the lower virtual image display area A3l) located at the lower side.

The reason for this is as follows. With respect to targets which are visually recognized through the front windshield 11, the probability that a target located at the upper side exists at a nearer position than a target located at the lower side is high, and in consideration of this characteristic, the focal distance of the virtual image displayed at the upper side is set to be longer than the focal distance of the virtual image displayed at the lower side, whereby the load imposed on the vehicle occupant when the vehicle occupant focuses his/her eyes.

In this embodiment, at least the upper virtual image display area A3u formed in the area corresponding to the upper area of the front windshield 11 and the lower virtual image display area A3l formed in the area corresponding to the lower area of the front windshield 11 are formed in the front windshield corresponding area A1.

According to the foregoing, a virtual image having a proper focal distance corresponding to a position in the front windshield corresponding area A1 can be displayed in each of the upper virtual image display area A3u and the lower virtual image display area A3l.

Furthermore, in this embodiment, a virtual image associated with information relating to the driving is displayed in the lower virtual image display area A3l, and a virtual image associated with information containing information other than the information relating to the driving is displayed in the upper virtual image display area A3u.

According to this construction, the virtual image displayed in the upper virtual image display area A3u can be visually recognized with relax by the vehicle occupant.

Furthermore, in this embodiment, the traveling state detector 20 (the traveling state detecting means) for detecting the traveling state is provided, and the vehicle head-up display device 1 displays a virtual image in the upper virtual image display area A3u when the traveling state detector 20 detects that the vehicle 10 is under stopping.

According to this construction, considering that it is improper to display a virtual image in the upper virtual image display area A3u during the driving, display of a virtual image in the upper virtual image display areas A3u can be executed only during the stopping.

Still furthermore, in this embodiment, the projection unit for projecting light (image light) for displaying a virtual image is provided for each of the plural virtual image display areas formed in the front windshield corresponding area A1.

Accordingly, the focal distance of the virtual image to be displayed can be surely different among the plural virtual image display areas with a simple construction.

In this embodiment, the projecting portion is provided every virtual image display area to display virtual images whose focal distances are different among the virtual image display areas. However, the construction for displaying virtual images whose focal distances are different among the virtual image display areas is not limited to the above construction. For example, it may be implemented by operating a projection optical system based on one projecting unit and a reflection lens or by using software-based means.

Modification of First Embodiment

Next, a modification of the first embodiment will be described.

Figure 7:
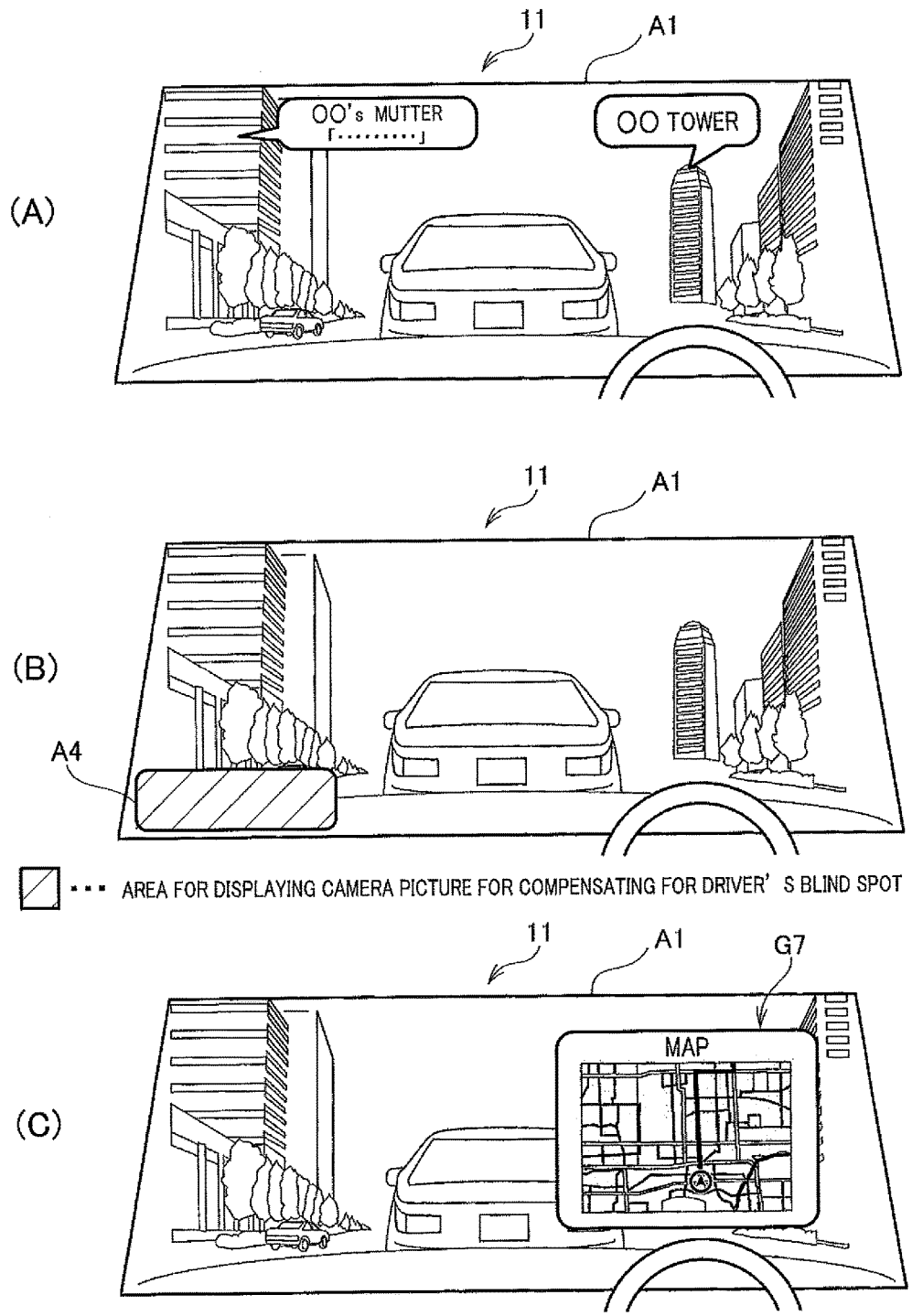
FIG. 7 is a diagram showing a display example of a virtual image.

In the first embodiment, the types of information associated with virtual images displayed in the upper virtual image display area A3u have been described by citing specific examples, but it is needless to say that the type of information is not limited to the above examples. For example, as shown in FIG. 7(A), a virtual image associated with information representing the appellation of a building or the like which can be visually recognized through the upper portion of the front windshield 11 may be displayed by using the technique of AR (Augmented Reality) as shown in FIG. 7(A). Furthermore, as shown in FIG. 7(A), when information is achievable from a short sentence contribution information service, a contributed short sentence may be displayed. In addition, various kinds of distributed information such as information associated with various kinds of SNS (Social Networking Service), information on sites of the Internet, road traffic information, etc., still pictures such as photographs, etc., moving pictures such as movies, promotion video, etc., may be displayed in the upper virtual image display area A3u.

Furthermore, in this embodiment, on the basis of a mail received by the cellular phone 27, the vehicle head-up display device 1 displays the virtual image G4 associated with information on a mail in the upper virtual image display area A3u, and also on the basis of news distributed to the cellular phone 27, the vehicle head-up display device 1 displays the virtual image G5 associated with information representing the news in the upper virtual image display area A3u. However, the vehicle head-up display device 1 or the in-vehicle navigation device 30 connected to this device may be configured to directly acquire mails, news or other entertainment-based information by accessing to an external server and receiving distribution from the external server. In this case, the vehicle head-up display device 1 or the equipment connected to the device 1 may be provided with a communication module for communicating with the external server through a network such as the Internet or the like, or communicates with the external server through the cellular phone 27.

As shown in FIGS. 7(B) and 7(C), the focal distance of the virtual image may be made different between the right and left sides in the front windshield corresponding area A1.

Describing the examples of FIG. 7(B), (C) in more detail, an area A4 in which a camera picture for compensating for a driver's blind spot is displayed is formed at the lower left side when the front windshield corresponding area A1 is viewed from the vehicle occupant. In the example of FIG. 7(B), a dedicated camera device for imaging a picture for compensating the driver's blind spot is mounted in the vehicle 10, and a proper input from the camera device to the vehicle head-up display device 1 can be performed.

The focal distance of a virtual image displayed in the area A4 is set to be shorter than the focal distance of a virtual image displayed at the right side of the area A4. For example, the focal distance of a virtual image displayed in the area A4 in FIG. 7(B) is set to be shorter than the focal distance of a virtual image G7 displayed in FIG. 7(C).

That is, the picture for compensating for the driver's blind spot is a picture which is assumed to be visually recognized when the vehicle 10 is started to move, backed, stopped or the like. In such a situation, the driver visually recognizes meters provided to the vehicle 10, the state of a gear or the like or visually recognizes the neighborhood of the vehicle 10 in many cases. When the driver who visually recognizes the meters, the state of the gear or the like visually recognizes the virtual image, the load imposed on the driver who focuses his/her eyes can be reduced by shortening the focal distance of the virtual image displayed in the area A4.

In order to set the focal distance of the virtual image displayed in the area A4 to be shorter than the focal distance of the virtual image displayed at the right side of the area A4, a projecting unit for displaying the virtual image in the area A4 may be provided.

As described above, proper display based on the fact that the vehicle head-up display device 1b is provided in the vehicle 10 can be performed by making the focal distance of the virtual image different between the right and left sides.

When the field of vision through the front windshield 11 is bad due to night or because the vehicle 10 exists in a tunnel or the like, a virtual image on the driving may be displayed in the upper virtual image display area A3u during traveling.

For example, when the brightness of the surrounding of the vehicle 10 is detected by using an illuminance sensor or the like and the brightness is equal to a predetermined threshold value or less, a virtual-image displayable area is set with respect to a predetermined area in the upper virtual image display area A3. A virtual image associated with information on the driving, for example, information representing the presence or absence of a pedestrian, information representing a road condition (for example, the shape of a road, the presence or absence of a preceding vehicle, road congestion or the like) or information on navigation is displayed in the area concerned. As means for acquiring the information associated with the virtual image to be displayed may be used any means, for example, means for acquiring the information on the basis of an output of the camera 23, means for acquiring the information through a network or the like.

By maximizing the use of the characteristic that the focal distance of the virtual image displayed in the upper virtual image display area A3l is long, the virtual image can be displayed in a proper style even under a condition that the field of vision through the front windshield 11 is bad with the construction as described above.

Second Embodiment

Next, a second embodiment will be described.

Figure 8:
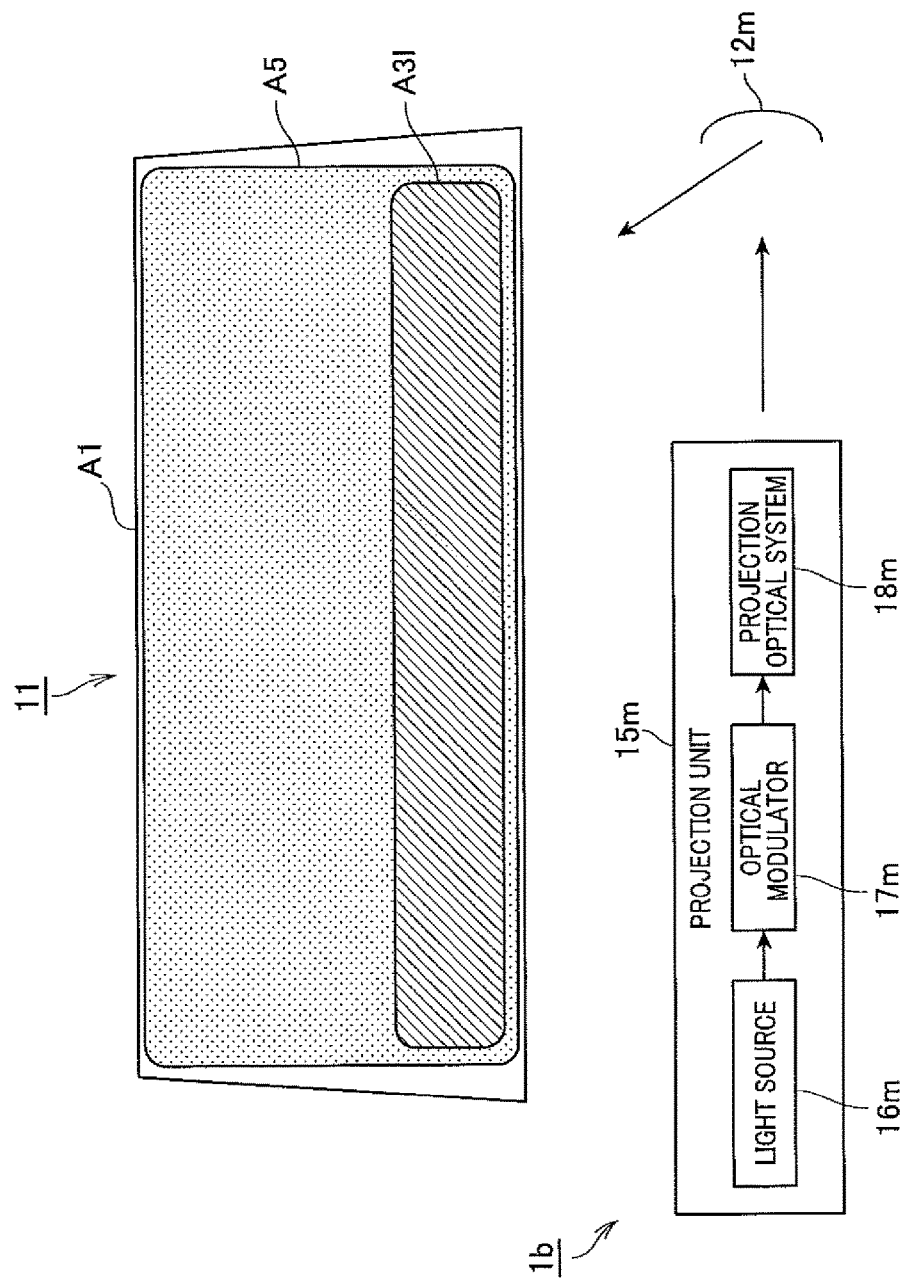
FIG. 8 is a diagram showing an area where a virtual image is displayed in a head-up display apparatus for a vehicle according to a second embodiment.

FIG. 8 is a schematic diagram which shows, in a suitable style for description, the construction of the vehicle head-up display device 1b according to the second embodiment and an area in which a virtual image is displayed by the device. With respect to constituent elements of the vehicle head-up display device 1b according to the second embodiment, the same constituent elements as the vehicle head-up display device 1 according to the first embodiment are represented by the same reference numerals, and the description thereof is omitted.

As shown in FIG. 8, the vehicle head-up display device 1b has a projection unit 15m for projecting light for a virtual image, and the projection unit 15m has a light source 16m, an optical modulator 17m and a projection optical system 18m. An image (light) emitted from the projection optical system 18m is projected to the projection face 13 formed on the front windshield 11 through a reflection mirror 12m to form a virtual image (image).

As shown in FIG. 8, a virtual image displayable area A5 is formed in the front windshield corresponding area A1. The virtual image displayable area A5 is the maximum area where a virtual image can be displayed by the projection unit 15m. That is, the projection unit 15m can display a virtual image (image) at any position within the virtual image displayable area A5.

In the virtual image displayable area A5, the lower virtual image display area A3l described in the first embodiment is formed in the area corresponding to the lower area of the front windshield 11.

Figure 9:
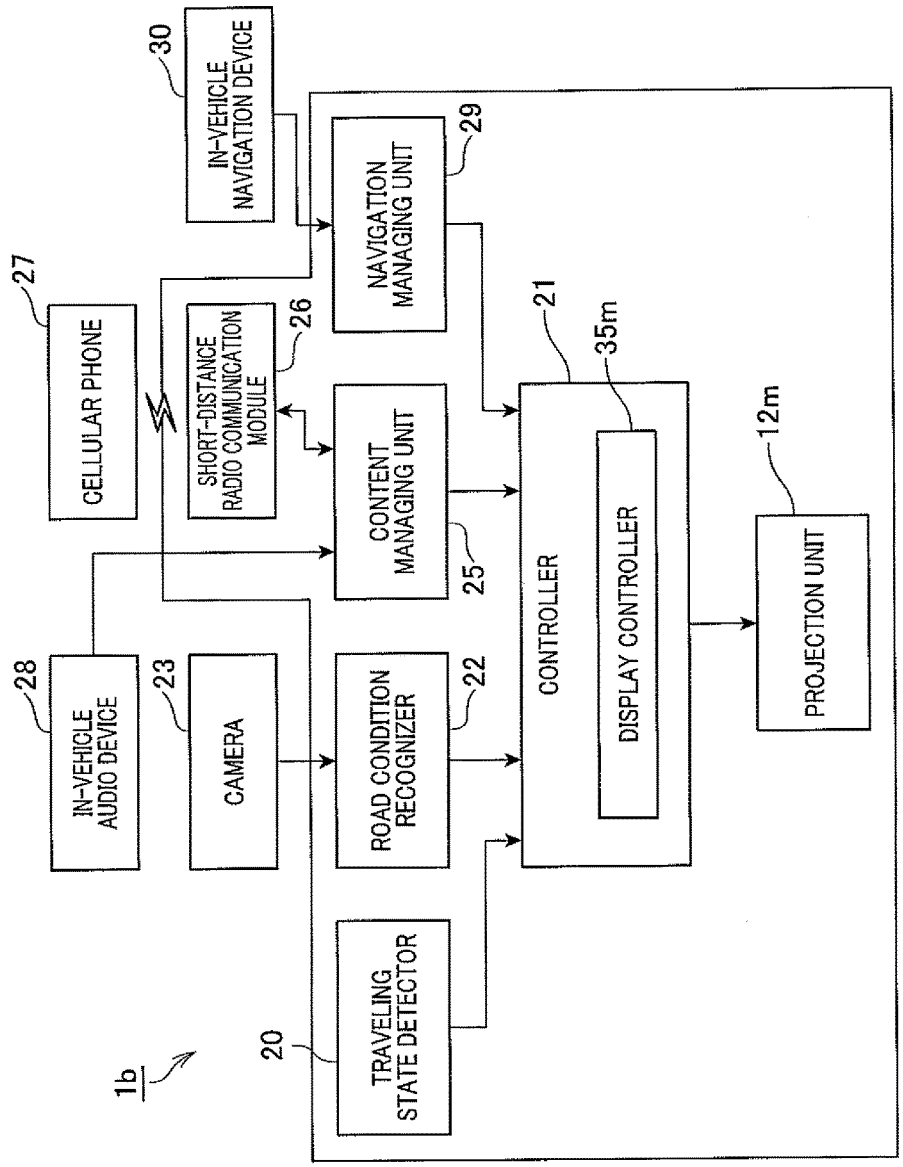
FIG. 9 is a diagram showing a functional construction of the head-up display apparatus for the vehicle.

FIG. 9 is a block diagram showing the functional construction of the vehicle head-up display device 1b.

As is apparent from the comparison between FIGS. 3 and 9, the controller 21 of the vehicle head-up display device 1b according to this embodiment has a display controller 35m in place of the upper display controller 35u and the lower display controller 35l.

Next, the operation of the vehicle head-up display device 1b will be described.

As in the case of the first embodiment, in the vehicle head-up display device 1b according to this embodiment, only the lower virtual image display area A3l is set as an area for displaying a virtual image while the vehicle 10 travels (=a period excluding a period when the vehicle is stopped with the parking brake being activated). Accordingly, the display of a virtual image at a proper position which considers the situation that the vehicle 10 is under traveling is performed. During traveling, the virtual image associated with the information on the driving is displayed in the lower virtual image display area A3l as shown in the examples of FIGS. 4(A), (B).

On the other hand, when the vehicle 10 stops, the vehicle head-up display device 1b performs the following operation.

Figure 10:
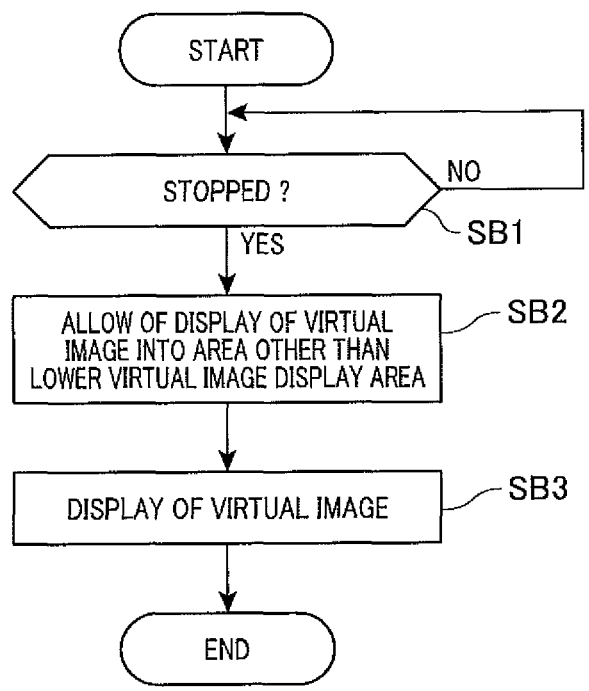
FIG. 10 is a flowchart showing the operation of the head-up display apparatus for the vehicle.

FIG. 10 is a flowchart showing the operation of the vehicle head-up display device 1b when the vehicle 10 under traveling stops. It is assumed that the vehicle 10 is traveling at the start time point of the flowchart of FIG. 10.

Referring to FIG. 10, the display controller 35m of the controller 21 monitors on the basis of an input from the traveling state detector 20 whether the vehicle 10 is stopped under the state that the parking brake is activated (step SB1). When the vehicle 10 stops (step SB1: YES), the controller 21 releases prohibition of display of virtual images in the areas other than the lower virtual image display area A3l, and allows display of virtual images in the whole area of the virtual image displayable area A5 (step SB2). That is, the whole area of the virtual image displayable area A5 is set as the virtual-image displayable area.

Subsequently, the display controller 35m controls the projection unit 15m to display a proper image (step SB3). At this time, the display controller 35m can also display a virtual image in an area other than the lower virtual image display area A3l.

For example, it is assumed that a virtual image associated with a television picture is set to be displayed in an area A6 from the center of the virtual image displayable area A5 to the upper portion thereof (see FIG. 11) while the vehicle 10 stops with the parking brake being activated). The vehicle 10 is provided with a television device, and the vehicle head-up display device 1b is assumed to receive a proper input from the television device. In this case, the display controller 35m displays a virtual image associated with a television picture in the area from the center of the virtual image displayable area A5 to the upper portion thereof as shown in FIG. 11.

The following effect can be achieved by performing the operation as described above.

That is, during traveling of the vehicle 10, the state that a virtual image is displayed in a limited proper area is maintained. During stopping of the vehicle 10, a virtual image is allowed to be displayed in an area which corresponds to the virtual image displayable area A5 and is remarkably broader and easier to be visually recognized by the vehicle occupant as compared with the lower virtual image display area A3l. Therefore, as compared with a case where virtual images are displayed in only the lower virtual image display area A3l, a larger variety of information can be supplied to the vehicle occupant. Furthermore, for example, when a virtual image associated with a movie or promotion video picture is displayed, pictures having presence can be supplied.

The area which enables display of a virtual image during stopping is not limited to the virtual image displayable area A5. For example, the area corresponding to the upper virtual image display area A3u of the first embodiment described above may be set as the area which enables display of a virtual image during stopping. That is, the virtual image is allowed to be displayed in the area other than the lower virtual image display area A3l, whereby the effect described above can be achieved.

Furthermore, the information associated with the virtual image displayed during stopping is not limited to the above examples. That is, any information such as mails, information relating to news distribution, contents which are described as examples in the first embodiment may be used.

The invention described with reference to the second embodiment is applicable to vehicle head-up display devices whose types are different from the type of vehicle head-up display device for forming a virtual image by projecting light to the projection face. For example, the present invention is applicable to a vehicle head-up display device in which the front windshield 11 is constructed by a translucent type liquid panel or other types of panels and an image is directly displayed on the shield. That is, the present invention is broadly applicable to a vehicle head-up display device for displaying an "image" such as a virtual image, a picture or the like.

As described above, the vehicle head-up display device 1b according to this embodiment changes the mode of the area for displaying the virtual image (image) in accordance with the traveling state detected by the traveling state detector 20.

According to this embodiment, the virtual image can be displayed in only the proper area corresponding to the traveling state of the vehicle 10. That is, the vehicle head-up display device 1b can perform proper display based on the fact that the vehicle head-up display device 1b is mounted in the vehicle 10.

In this embodiment, the vehicle head-up display device 1b changes the mode of the area for displaying the virtual image (image) in the front windshield corresponding area A1 according to the traveling state detected by the traveling state detector 20.

More specifically, when it is detected by the traveling state detector 20 that the vehicle 10 is under traveling, the area corresponding to the lower area of the front windshield 11 is set as a virtual-image (image) display area, and when it is detected by the traveling state detector 20 that the vehicle 10 is under stopping, the area containing the area other than the lower portion of the front windshield 11 is set as the virtual-image (image) display area.

Accordingly, during traveling of the vehicle 10, the state that a virtual image is displayed in a limited proper area is maintained. During stopping of the vehicle 10, a virtual image can be displayed in an area which is remarkably broader and easier to be visually recognized by the vehicle occupant as compared with the lower virtual image display area A3*l*, which corresponds to the virtual image displayable area A5. Therefore, as compared with the case where a virtual image is displayed in only the lower virtual image display area A3*l*, a larger variety of information can be supplied to the vehicle occupant. Furthermore, for example when a virtual image associated with a movie or a promotion video picture is displayed, pictures giving presence can be supplied.

The above-described embodiments merely show a mode of the present invention, and any modification and application may be made within the present invention. For example, the vehicle head-up display device may be configured by combining at least a part of the technique described with reference to the first embodiment and at least a part of the technique described with reference to the second embodiment. For example, in the vehicle head-up display device 1 according to the first embodiment, the display modes of the upper virtual image display area A3*u* and the lower virtual image display area A3*l* may be changed in accordance with the traveling state of the vehicle 10.

DESCRIPTION OF REFERENCE NUMERALS 1, 1*b* vehicle head-up display device
10 vehicle
11 front windshield
13 projection face
15*l* lower projection unit
15*m* projection unit
15*u* upper projection unit
20 traveling state detector (traveling state detecting means)
21 controller
35*l* lower display controller
35*m* display controller
35*u* upper display controller
A1 front windshield corresponding area
A3*l* lower virtual image display area (virtual image display area)
A3*u* upper virtual image display area (virtual image display area)

The invention claimed is:

1. A vehicle head-up display device comprising:
a projection unit projecting light to form an upper virtual image display area formed in an area corresponding to an upper area of a front windshield or a projection face formed on a member that is provided so as to correspond to the front windshield, and a lower virtual image display area formed in an area corresponding to a lower area of the front windshield or the projection face formed on the member that is provided so as to correspond to the front windshield and display a virtual image in a front windshield corresponding area as an area corresponding to the front windshield; and
a controller
setting a focal distance of a virtual image to be displayed in the upper virtual image display area to be longer than a focal distance of a virtual image to be displayed in the lower virtual image display area,
setting the focal distance of the virtual image to be displayed in the upper virtual image display area to be a focal distance corresponding to a focal point of vehicle occupant's eyes when the vehicle occupant visually recognizes a target through the area corresponding to the upper virtual image display area,
setting the focal distance of the virtual image to be displayed in the lower virtual image display area to be a focal distance corresponding to a focal point of the vehicle occupant's eyes when the vehicle occupant visually recognizes a target through the area corresponding to the lower virtual image display area,
displaying a virtual image associated with information other than information relating to driving in the upper virtual image display area during stopping of a vehicle, and
prohibiting display of the virtual image associated with the information other than the information relating to the driving in the upper virtual image display area during not stopping of the vehicle,
wherein the controller is connected with an illuminance sensor to detect brightness of surrounding of the vehicle,
when the brightness is equal to or less than a predetermined threshold value, and when the vehicle is traveling, the virtual image associated with the information relating to the driving is displayed in the upper virtual image display area,
the focal distance of the virtual image in the upper virtual image display area is long when the virtual image is displayed in a condition that the brightness is equal to or less than the predetermined threshold value,
wherein the front windshield is divided at a center in a lateral direction into a right area and a left area of the front windshield,
wherein the controller forms a right-side virtual image display area in an area corresponding to the right area of the front windshield and a left-side virtual image display area in an area corresponding to the left area of the front windshield which are away from one another, and virtual images to be displayed in the right-side virtual image display area and the left-side virtual image display area are different in focal distance.

2. The vehicle head-up display device according to claim 1, wherein with respect to a plurality of virtual image display areas formed in the front windshield corresponding area, the projection unit for projecting light is provided for each of the areas.

3. A vehicle head-up display device comprising:
a projection unit projecting light to form an upper virtual image display area formed in an area corresponding to an upper area of a front windshield or a projection face formed on a member that is provided so as to correspond to the front windshield, and a lower virtual image display area formed in an area corresponding to a lower area of the front windshield or the projection face formed on the member that is provided so as to correspond to the front windshield and display a virtual image in a front windshield corresponding area as an area corresponding to the front windshield;
a blind spot image projection unit projecting light to form a virtual image display area formed in the lower virtual image display area of the front windshield corresponding area so as to display a blind spot image for compensating a vehicle occupant's blind spot; and
a controller
setting a focal distance of a virtual image to be displayed in the upper virtual image display area to be longer than a focal distance of a virtual image to be displayed in the lower virtual image display area,
setting the focal distance of the virtual image to be displayed in the upper virtual image display area to be a focal distance corresponding to a focal point of vehicle occupant's eyes when the vehicle occupant visually recognizes a target through the area corresponding to the upper virtual image display area, setting the focal distance of the virtual image to be displayed in the lower virtual image display area to be a focal distance corresponding to a focal point of the vehicle occupant's eyes when the vehicle occupant visually recognizes a target through the area corresponding to the lower virtual image display area, displaying a virtual image associated with information other than information relating to driving in the upper virtual image display area during stopping of a vehicle, and prohibiting display of the virtual image associated with the information other than the information relating to the driving in the upper virtual image display area during not stopping of the vehicle, wherein the controller is connected with an illuminance sensor to detect brightness of surrounding of the vehicle, when the brightness is equal to or less than a predetermined threshold value, and when the vehicle is traveling, the virtual image associated with the information relating to the driving is displayed in the upper virtual image display area, the focal distance of the virtual image in the upper virtual image display area is long when the virtual image is displayed in a condition that the brightness is equal to or less than the predetermined threshold value, wherein the controller is connected with at least one camera device, which is mounted in the vehicle, and the blind spot image for compensating the vehicle occupant's blind spot is transmitted from the camera device to the blind spot image projection unit, and the blind spot image projection unit displays the blind spot image for compensating for the vehicle occupant's blind spot in the lower virtual image display area of the front windshield corresponding area.

4. The vehicle head-up display device according to claim 3, wherein the front windshield corresponding area as area corresponding to the front windshield is divided at a center in a lateral direction into a left area and a right area, the blind spot image projection unit displays the blind spot image in the left area of the lower virtual image display area, and a focal distance of the blind spot image displayed in the left area of the lower virtual image display area is set to be shorter than a focal distance of the right area of the front windshield corresponding area.

\* \* \* \* \*